United States Patent
Rushford

(10) Patent No.: US 6,804,009 B2
(45) Date of Patent: Oct. 12, 2004

(54) WOLLASTON PRISM PHASE-STEPPING POINT DIFFRACTION INTERFEROMETER AND METHOD

(75) Inventor: Michael C. Rushford, Livermore, CA (US)

(73) Assignee: The Regents of the University of California, Oakland, CA (US)

(*) Notice: Subject to any disclaimer, the term of this patent is extended or adjusted under 35 U.S.C. 154(b) by 221 days.

(21) Appl. No.: 10/087,482

(22) Filed: Feb. 28, 2002

(65) Prior Publication Data
US 2002/0126292 A1 Sep. 12, 2002

Related U.S. Application Data

(63) Continuation-in-part of application No. 09/564,073, filed on May 3, 2000.

(51) Int. Cl.⁷ .................................................. G01B 9/02
(52) U.S. Cl. ......................................... 356/492; 356/521
(58) Field of Search ............................... 356/492, 495, 356/520, 521

(56) References Cited

U.S. PATENT DOCUMENTS

| | | |
|---|---|---|
| 2,924,142 A | 2/1960 | Nomarski |
| 3,495,890 A | 2/1970 | Pluta |
| 4,541,697 A | 9/1985 | Remijan |
| 4,764,014 A | 8/1988 | Makosch et al. |
| 4,872,755 A | 10/1989 | Kiichel |
| 4,906,852 A | 3/1990 | Nakata et al. |
| 5,361,312 A | 11/1994 | Kuchel |
| 5,548,403 A * | 8/1996 | Sommargren ............... 356/477 |
| 5,835,217 A | 11/1998 | Medecki |
| 5,898,500 A | 4/1999 | Canteloup |
| 5,973,784 A | 10/1999 | Szwaykowski et al. |

FOREIGN PATENT DOCUMENTS

WO      WO 97/44633 A1      11/1997

OTHER PUBLICATIONS

M. Francon & S. Mallick, Polarization Interferometers, Applications in Microscopy and Macroscopy, Wiley Interscience 1971 pp. 26–27; 88–91; 98–99.

* cited by examiner

Primary Examiner—Samuel A. Turner
(74) Attorney, Agent, or Firm—James S. Tak; Alan H. Thompson

(57) ABSTRACT

A Wollaston prism phase-stepping point diffraction interferometer for testing a test optic. The Wollaston prism shears light into reference and signal beams, and provides phase stepping at increased accuracy by translating the Wollaston prism in a lateral direction with respect to the optical path. The reference beam produced by the Wollaston prism is directed through a pinhole of a diaphragm to produce a perfect spherical reference wave. The spherical reference wave is recombined with the signal beam to produce an interference fringe pattern of greater accuracy.

10 Claims, 4 Drawing Sheets

WOLLASTON PRISM PHASE-STEPPING POINT DIFFRACTION INTERFEROMETER AND METHOD

This application is a continuation-in-part of U.S. patent application Ser. No. 09/564,073, entitled "Optical Monitor and Method for Real Time Thickness Change Measurements via Lateral-Translation Induced Phase-stepping Interferometry," filed on May 3, 2000. +gi The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to interference metrology of polarized light for testing of optics. In particular, the present invention relates to a phase-stepping point diffraction interferometer and method which effects phase-stepping by linear translation of a Wollaston prism in a lateral direction to the optical path, and which utilizes a spherical reference wave for producing high contrast interferograms.

2. Description of Related Art

It is desirable to improve on the accuracy of techniques for etching structures into SiO2 to a desired depth by monitoring the etch depth in real time. It has been observed that the SiO2 etch rate in Buffered HF vary from 14 to 17 nm per minute. For a 384 nm etch depth, this can become an 82 nm etch depth uncertainty. It is desirable to reduce this uncertainty to less than 10 nm.

Previously, the present inventors have etched to approximately 80% of the desired depth, removed the mask in the region of interest, measured the current etch depth and recalculated an expected end point at the current etch rate. The SiO2 etch was then completed and its depth was measured at a different inspection point, as was done for the 80% point, and then again to confirm the expected etch depth result. This proved to be a time-consuming and labor-intensive process requiring extensive handling of the part. It is desirable to eliminate these steps and etch to a consistent, repeatable endpoint by monitoring the etch depth in real time.

All currently available step height measuring instruments require dry first surface access. It is preferable that a real time monitor be provided that can view the surface being etched from the back side. No instrument maker has done this to date. Also, the reflectivities of the surfaces being etched are not large due to the effective index-matching of water and optical surfaces.

An interferometric instrument is desired that will reduce the work required to insure SiO2 etch depths are done accurately to within +/−5 nm, while improving process yield and reducing fluid consumption and the concomitant hazardous waste disposal costs. Slow degradation of the etchant solution as it is consumed is not of consequence if the etch rate is monitored, and thus the etchant remains viable for many cycles and waste disposal costs are significantly lowered.

Furthermore, it is also desirable for such interferometers and interferometric instruments to produce high contrast interferograms which enable precision measurements. To this end it is desirable to utilize a "perfect" reference wave; that is it should be simple and well characterized, such as a spherical wave. Perfect reference waves are typically produced by passing light through a small aperture, such as a pinhole or slit. One example of a point diffraction interferometer using a perfect spherical reference wave is described in U.S. Pat. No. 5,835,217 to Medecki. Use of perfect reference waves can provide improved measurements in both etch monitoring applications described above, as well as testing of optics and optical systems. Optical systems in particular can be more confidently tested for aberrations when a perfect reference wave is used.

Additionally, it is also desirable to ensure precise control of the phase shifting process for even greater measurement precision and accuracy. Accurate phase shifting, however, is not easily accomplished. In particular, the common phase shifting method of translating mirrors in a direction of the optical path is difficult due to the exaggerated effects of even minute mirror motions. Various other methods and arrangements have been developed to facilitate and improve phase shifting. For example, in U.S. Pat. No. 4,906,852 to Nakata et al, a Wollaston prism and a quarter wave plate are used to shear light into two beams. A wedge glass is then used to vary the optical path difference (OPD) of one of the beams relative to the other to thereby impart a phase shift. Nakata is a representative example of many interferometer arrangements utilizing a Wollaston prism for the limited exclusive purpose of beam shearing. Specifically, it does not directly employ the Wollaston prism to impart a phase shift. Separating the beam shearing and phase shifting functions between a Wollaston prism and an independent phase-shifting module, however, can increase the cost and complexity of the interferometer without adding much value or significantly improving results.

SUMMARY OF THE INVENTION

The present invention provides a phase-stepping point diffraction interferometer utilizing a Wollaston prism to shear light into reference and signal beams, wherein the reference beam is transformed into a spherical reference wave to produce high contrast images for accurate fringe phase measurement.

Additionally, the present invention provides a phase-stepping point diffraction interferometer which translates a Wollaston prism in a lateral direction to an optical path in order to cause phase stepping.

The present invention also provides a Wollaston prism phase-stepping point diffraction interferometer wherein phase-stepping is mechanically advantaged due to increased stroke length of the laterally translated Wollaston prism.

One aspect of the present invention is a phase-stepping point diffraction interferometer utilizing a Wollaston prism to provide both image shearing and to effect phase stepping. The interferometer comprises a light source for directing light toward a test optic along an optical path, and a Wollaston prism for shearing the light into a signal beam and a reference beam. A diaphragm is provided with a pinhole through which the reference beam is directed for producing a spherical reference wave. The interferometer also comprises means for detecting an interference fringe pattern produced by recombining the signal beam and the spherical reference wave. The interferometer also includes means for translating the Wollaston prism in a lateral direction with respect to the optical path so as to cause phase shifting of the signal beam and the spherical reference wave. And the interferometer has means for measuring a phase value of the interference fringe pattern by phase shifting the signal beam and the spherical reference wave.

Another aspect of the present invention is for a method for interferometrically testing a test optic utilizing a phase-stepping point diffraction interferometer arrangement. The method directs light from a light source along an optical path toward the test optic. Additionally, the light is directed through a Wollaston prism to shear the light into a reference beam and a signal beam. The reference beam is directed through a pinhole of a diaphragm to produce a spherical reference wave. Next the signal beam and the spherical reference wave are recombined to produce an interference fringe pattern on a detector. Finally, a phase value of the interference fringe pattern is measured by translating the Wollaston prism in a lateral direction with respect to the optical path so as to phase-shift the signal beam and the spherical reference wave.

DETAILED DESCRIPTION OF THE INVENTION

The present invention includes a Wollaston prism phase-stepping interferometer which translates a Wollaston prism to effect a phase step and a unique optical monitoring instrument designed to monitor etch depth and etch rate for controlling a wet-etching process.

Turning first to the optical monitoring instrument, provides means for viewing through the back side of a thick optic onto a nearly index-matched interface. Optical baffling minimize spurious reflections. The application of a photoresist forms a reference reflection surface that balances the reflected intensities between the water—SiO2 interface and the Resist —SiO2 interface. A Wollaston prism enables linear translation for phase stepping. Phase unwrapping occurs while etching proceeds to provide a smooth measurement of actual etch depth.

The optical monitor must be useable on a machine that will vibrate and move. To minimize sensitivity to vibrations, a common path monolithic interferometer construction, using the same surface as signal and reference, is chosen as a starting point. The design features of the present invention can be realized with a shearing interferometer. Polarization based interferometers use crystal birefringence to shear the image. The relative intensity between the two images can be adjusted by aligning linear polarizers relative to the optical axis of the crystal.

Figure 1:
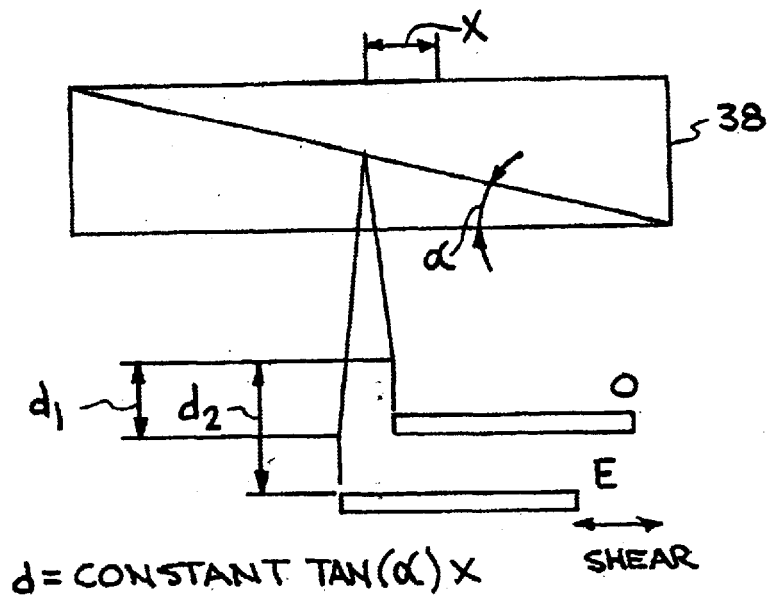
FIG. 1 shows image shear and optical path difference in a Wollaston prism crystal interferometer.

The phase between each image can be changed by translation of a Wollaston prism. FIG. 1 shows the nature of the phase delay between orthogonal linear polarizations from a Wollaston prism crystal-based interferometer. In this embodiment, two images of the same surface are compared; one is laterally translated with respect to the other with a different polarization. The image of the surface is in the vicinity of a step between a masked region and an adjacent bare surface exposed to the etchant. In the region of overlap of the sheared images labeled (d1) wave fronts (Ordinary polarization labeled O and Extraordinary polarization labeled E) from like surfaces (bare surface in this case) are compared. In the image region labeled (d2) different surfaces (masked and bare) are compared. This instrument measures the thickness difference between (d1) and (d2) as etching takes place. Generally (d2) and (d1) are the same at the start, so whatever the arbitrary phase difference is between fringes is defined as the zero point.

There is an optical phase shift "mechanical advantage" when phase stepping a crystal interferometer compared to non-common path split beam interferometers. In the case of a Wollaston prism, a linear translation of 50 microns will give an apparent half wave phase shift between its two orthogonal linear polarization wave fronts. A Michelson like interferometer would require very small half-micron movement for a quarter-wave phase shift. The phase shifting accuracy required in the Wollaston prism beam path is about 100 times less demanding than the Michelson like designs.

Figure 2:
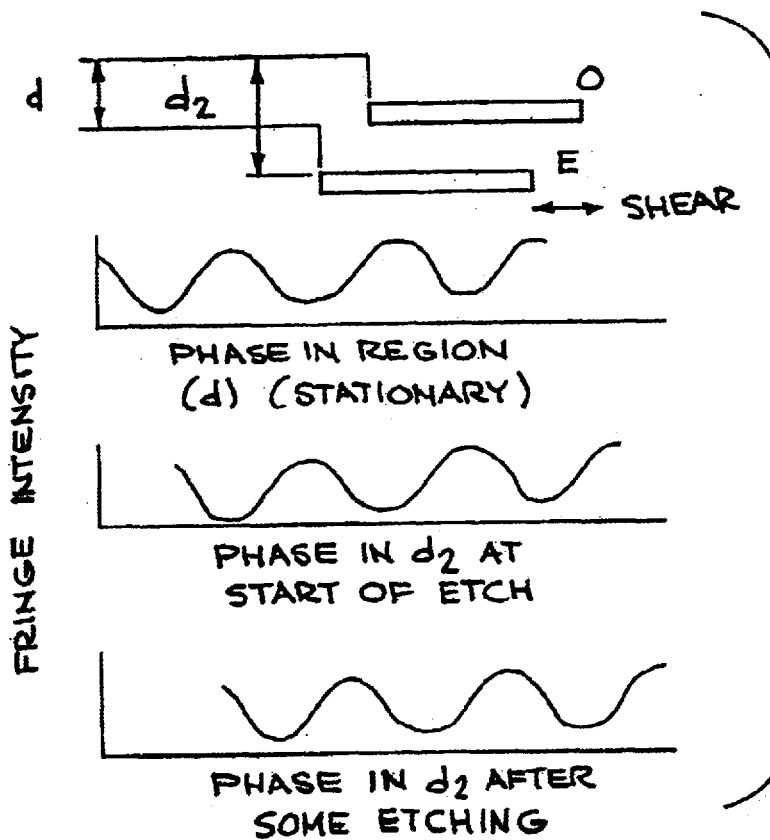
FIG. 2 illustrates that the fringes seen in each region (d1) and (d2) of image overlap are phased differently.

As illustrated in FIG. 2, the fringes seen in each region (d1) and (d2) of image overlap are phased differently. The fringe pattern resulting from (d1) is stationary, while that of (d2) moves as the surface is etched. Monitoring the phase change difference between the two as the etch proceeds is a direct measure of etch depth. Thus, phase measurement in a differential sheared interferometer can be used to measure etch depth. Etch depth is measured by scaling the phase difference between fringes in regions (d1) and (d2). No fringe order confusion occurs because the phase between these regions is a running sum.

Figure 3:
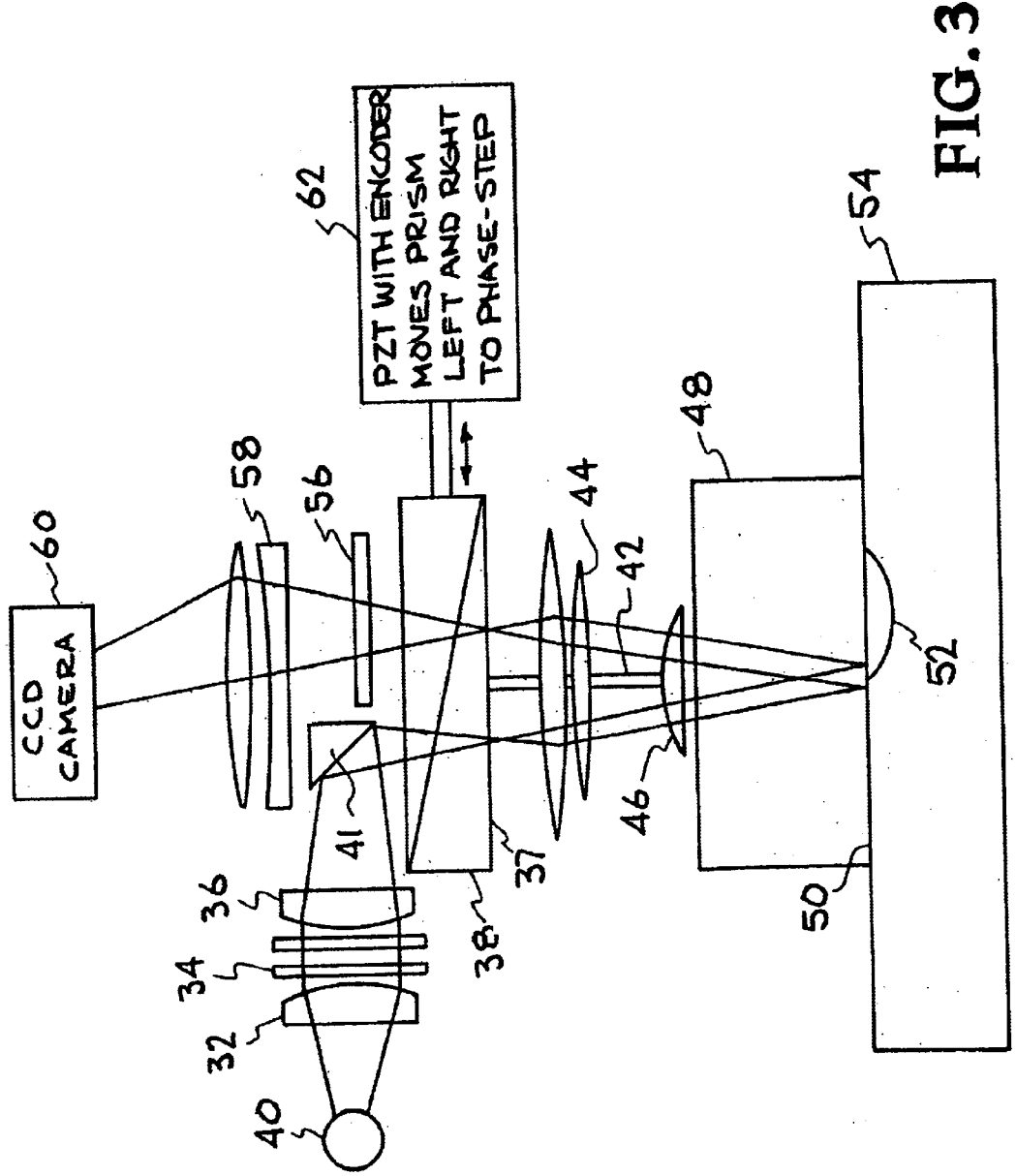
FIG. 3 is schematic of a Nomarski/Weill microscope design modified to be a phase-stepping interferometer of the present invention.

Normarski-Weill proposed a microscope illumination path that has proven useful in an application of the present invention. Its light path offers the least number of scattering surfaces in both the illumination and viewing paths. A schematic of the optical monitor, utilizing the Normarski-Weill microscope illumination path, as it relates to wet-etch monitoring is shown in FIG. 3. In FIG. 3, light from Hg vapor lamp 40 passes through a collimating lens 32, an then propagates through a 436 nm+/−10 nm bandpass filter 34 before being focused by lens 36 onto the exit face 37 of Wollaston prism 38. A mirror 40 is placed in the beam line between lens 36 and Wollaston prism 38. Baffle 42 splits the objective lens 44. The placement of baffle 44 in the objective optics eliminates spurious internal lens reflections that could add to noise in the measured phase shift. The baffle also protrudes from the lens to the back side of the optic being fabricated. In this way the light that reflects from this back side surface can not get into the measurement or detector side of the split objective.

Light from the Hg vapor lamp is focused by lens 46 through the bulk of the SiO2 substrate 48 for reflection from the surface 50 to be etched. The alignment of the light from the Hg lamp is made such that the beams from the Wollaston prism 38 overlap both the photoresist mask 52 and the aqueous etchant solution 54. Light from the overlapped beams pass through the SiO2 substrate 48 and lens 46 to then be focused by objective lens 44, onto surface 37 of Wollaston prism 38. The beams them continue through linear polarizers 56 (which are placed at 45 degrees), through focusing optics 58 and onto CCD camera 60. Wollaston prism 38 is connected to a piezoelectric transducer (PZT) 62 which includes an encoder. PZT 62 moves the Wollaston prism 38 to phase step the light from the Hg vapor lamp.

A design that minimizes scattering is important since a water wetted SiO2 and photo resist coated SiO2 surface reflects very little (0.3%) due to the small index contrasts at these interfaces. The index contrast is balanced for the SiO2-water and SiO2-photoresist interfaces of which monitoring is desired. The reflection light from the SiO2-water and the SiO2-photoresist interface are made equal so to maximize interference fringe visibility. In practice, application of a thick, irregular dot of resist as the mask has proven to substantially eliminate reflections from the resist-water interface by virtue of the steep contact angle formed and the attenuation from absorption of the light in the bulk of the resist. It is very easy to apply this resist dot using an eyedropper. It's done just after a photo resist development and rides along on a hard bake cycle in preparation for HF etching.

Figure 4:
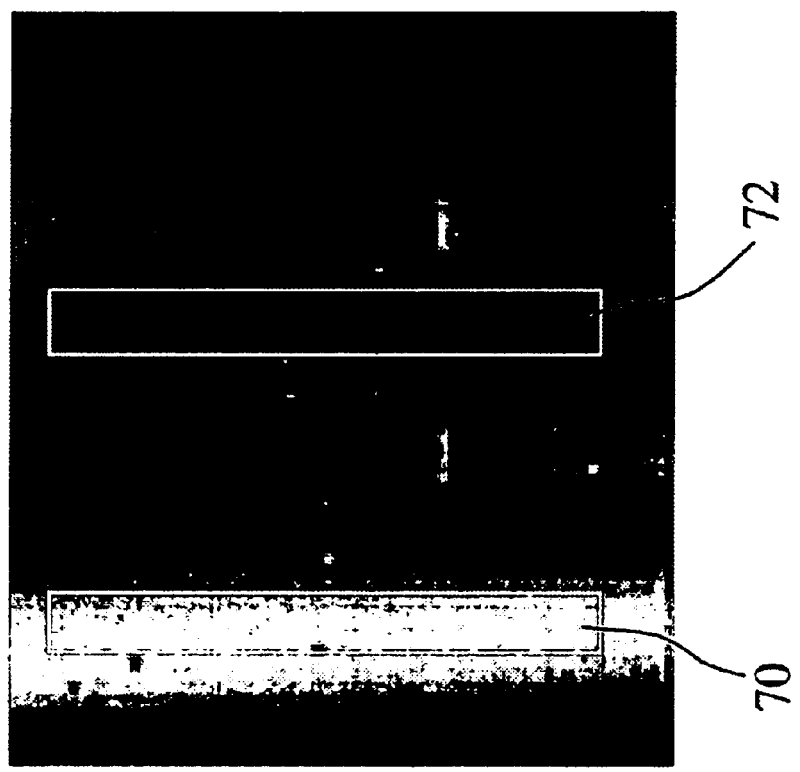
FIG. 4 is an image of the fringes generated by the present invention superimposed with the data reduction windows used to compare stationary and moving fringes.

FIG. 4 is a drawing that represents an example of the fringes generated by the instrument superimposed with the data reduction windows used to compare stationary and moving fringes. The thick photoresist mask is on the left in this image. The light that creates interference fringes in the left hand region 70 comes from the reflection of both polarizations of light reflecting off the resist-SiO2 interface. The fringe phase in this region is a constant since (d1) in FIG. 2 is constant throughout the etching. The window 72 shows the fringes that are due to one polarization of light reflecting off the resist-SiO2 interface interfering with the other polarization reflecting off of the SiO2 water interface. These fringes change their phase as the etching proceeds because d2 changes (see FIG. 2). These fringes march left or right depending on wave front tilts. The fringes shown in FIG. 4 are generated by the present invention in the vicinity of a step formed by the photoresist mask. This step is shown as a line separating the two boxed regions, which is where data is taken during phase measurement. The fringe phase in each box 70 and 72 is measured and these phases are subtracted from one another. In this way the measurement is a relative measurement that is declared zero at the start. The start is noted when the intensity from the SiO2 interface drops due to wetting by water. There is a chance the image as a whole could move and cause the entire set of fringes to move. Such an error biases the thickness (d1) and (d2) in the same way so that there is no net disturbance in the differential depth measurement.

Precision intensity measurements are required for phase stepping interferometers. To improve the signal-to-noise ratio with an 8-bit digitizer, all pixels in the boxed region shown are summed in 7 separate images. The resultant 32 bit intensity measurements are taken four times for each quarter-wave phase stepping of the Wollaston prism. In one embodiment, each step is a 9 micron long lateral movement of the Wollaston prism.

The phase stepping algorithm described in the Schwider et al. reference is used to make phase measurements according to the formula:

$$\tan\left(\Phi + \frac{\pi}{4}\right) = \frac{2(I_1 + I_2)}{I_0 - (I_1 - I_2) + I_3}$$

where $\phi$ is the gross phase of the test sample, and the intensities $I_0$-$I_3$ are taken at the four phase steps 0, $\pi/2$, $\pi$ and $3\pi/2$ respectively.

Experiments with this instrument have proven that local heating by the light source used does not cause a change in etch rate relative to the rest of the part. The fact that room-temperature HF-etching of fused silica is a surface-kinetic controlled process, not influenced by mixing, allows for monitoring only a 100 micron region to be representative of the etch depth experienced by a 40 cm square optic. This has been demonstrated in practice.

Figure 5:
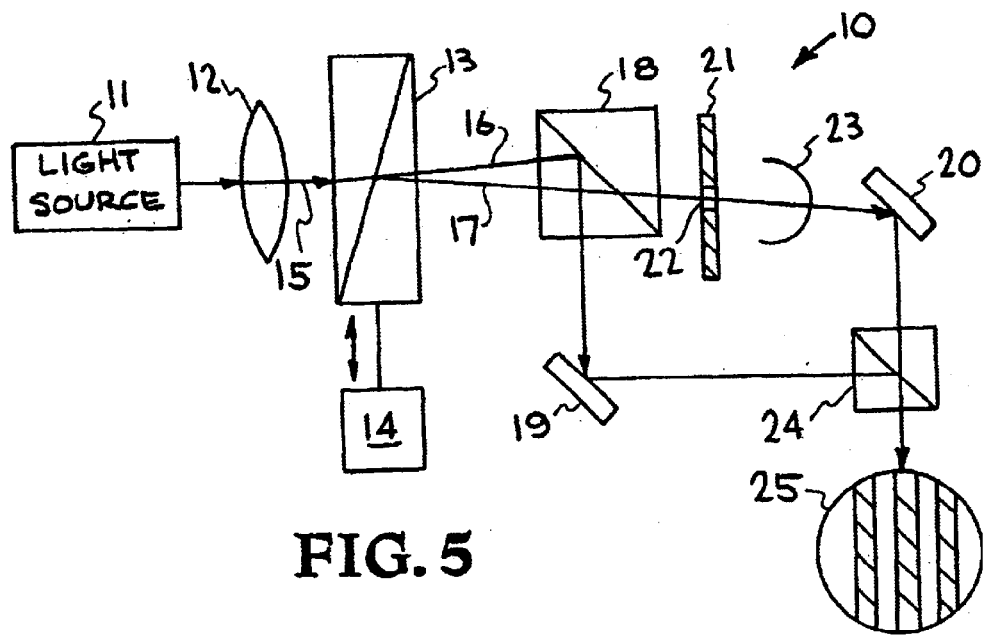
FIG. 5 is a plan view of a first preferred embodiment of the Wollaston prism phase-stepping point diffraction interferometer, with the Wollaston prism positioned downstream of the test optic.

Additionally, the aforementioned technique of laterally translating the Wollaston prism to effect phase stepping can also be utilized in a point diffraction interferometer arrangement to produce high contrast, high quality interferograms. Point diffraction of light passing through a small aperture, for example, a pinhole will produce a perfect spherical wave and used as a reference for phase stepping. In FIG. 5, a first preferred embodiment of a phase-stepping point diffraction interferometer is shown, generally indicated at reference character 10, and illustrating the optical path 15 of light through the point diffraction interferometer 10.

In particular, a light source 11 directs the light along the optical path 15 toward and through an optic 12 to be tested. It is appreciated that the test optic 12 can be a single optic piece, such as an eyeglass lens, or a larger optical system comprising multiple optic units. In any case, a Wollaston prism 13 is also provided and positioned downstream of the test optic 12. Due to the birefringent nature of the Wollaston prism 13 the light from the test optic 12 is sheared into an E beam component 16 and an O beam component 17 forming a shear angle therebetween. The E 16 and O 17 beams are utilized in the interferometer 10 as signal 16 and reference 17 beams, respectively. Further downstream, the signal 16 and reference 17 beams are split and subsequently recombined. Preferably, as shown in FIG. 5, the splitting and recombining of beams is arranged in a Mach-Zender interferometer configuration. It is appreciated, however, that other interferometric arrangements may be utilized as well. In the Mach-Zender arrangement shown, the splitting and recombining of beams is achieved using beam splitters, which are preferably polarized beam splitters 18 and 24. Thus, the reference beam 17 is passed through the beam splitters 18, 24, whereas the signal beam 16 is reflected.

In order to produce a perfect reference wave, the reference beam 16 exiting beam splitter 18 is passed through a pinhole 22 on a diaphragm 21. This generates an essentially perfect spherical reference wave 23. At the same time, signal beam 17 is reflected from the beam splitter 18 and a mirror 19 in an unaffected state. Both the spherical reference wave 23 and the signal beam 17 are recombined by polarized beam splitter 24 and directed onto a detector 25, such as a CCD camera or storage device. Illumination of the detector 25 in this manner produces a high contrast interference fringe pattern 26, which may be subsequently analyzed by phase stepping.

As can be seen in FIG. 5, the Wollaston prism 13 is arranged and configured for translation in a lateral direction with respect to the optical path 15. Preferably, as discussed previously, the Wollaston prism 38 is connected to a PZT 14 for translating the prism 38 and effecting the phase step. This arrangement has a mechanical advantage over non-common path split beam interferometers, e.g. via mirror translation, because it increases the stroke length needed to realize a phase step. Thus, a Wollaston prism translation which is many times greater (approx. 100×) than the phase shifting required, can impart a phase step between E and O waves. In the point diffraction interferometer 10 of the present invention, the mechanical advantage of Wollaston prism translation is combined together with the additional advantage of utilizing a perfect spherical wavefront 23 as a reference. The resulting interferometer 10 is self referencing, robust to phase stepping errors and able to accommodate balancing the intensity of the O-E wave fronts to enable high contrast images. Moreover, the placement of a test optic upstream of the Wollaston prism 38 provides for a compact configuration of the interferometer due to the fixed relative distances between the downstream (of the test optic) components, without requiring customization of the interferometer for different test optic pieces.

Figure 6:
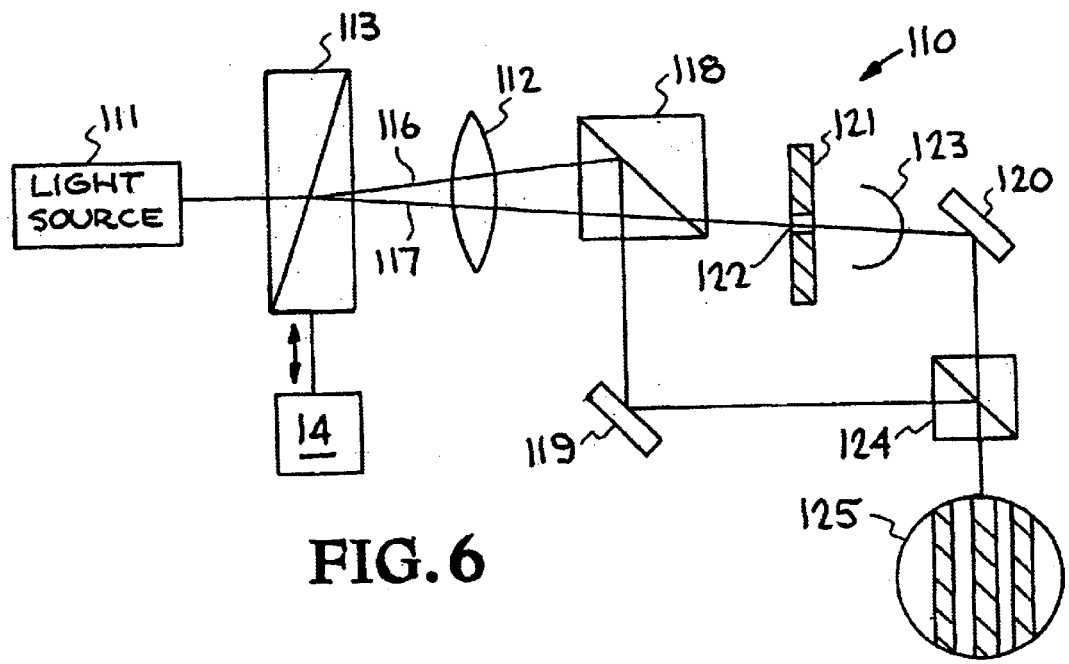
FIG. 6 is a plan view of a second preferred embodiment of the Wollaston prism phase-stepping point diffraction interferometer, with the Wollaston prism positioned between the light source and the test optic.

Similar to FIG. 5, FIG. 6 shows a second preferred embodiment of the phase-stepping point diffraction interferometer 110 having a Wollaston prism 113 positioned upstream of a test optic 112, between the light source 111 and the test optic 112. With this configuration, shearing of the signal 116 and reference 117 beams occurs prior to passing through the test optic 112. However, the mechanical advantage of Wollaston prism phase-stepping remains the same, as well as the production of a high contrast fringe pattern 126 resulting from the perfect spherical reference wave 123. As before in FIG. 5, the reference beam 117 and the signal beam 116 are split by beam splitter 118, with the reference beam 117 being passed through a pinhole 122 of a diaphragm 121 to produce the spherical reference wave 123. The signal beam 116 and the spherical reference wave 123 are each reflected by respective mirrors 119 and 120 and recombined by beam splitter 124, in the exemplary Mach-Zender arrangement shown, to produce the fringe pattern image 125.

Changes and modifications in the specifically described embodiments can be carried out without departing from the scope of the invention, which is intended to be limited by the scope of the appended claims.

I claim:

1. A phase-stepping point diffraction interferometer comprising:
   a light source for directing light toward a test optic along an optical path;
   a Wollaston prism for shearing the light into a signal beam and a reference beam;
   a diaphragm having a pinhole through which the reference beam is directed for producing a spherical reference wave;
   means for detecting an interference fringe pattern produced by recombining the signal beam and the spherical reference wave;
   means for translating the Wollaston prism in a lateral direction with respect to the optical path so as to cause phase shifting of the signal beam and the spherical reference wave; and
   means for measuring a phase value of the interference fringe pattern by translating the Wollaston prism in a lateral direction with respect to the optical path.

2. The interferometer as in claim 1, wherein the Wollaston prism is positioned along the optical path between the light source and the test optic.

3. The interferometer as in claim 1, wherein the Wollaston prism is positioned along the optical path downstream from the test optic.

4. The interferometer as in claim 1, wherein the means for recombining the spherical reference wave and the signal beam is a polarized beam splitter.

5. The interferometer as in claim 1, wherein the interferometer is a Mach-Zender interferometer.

6. The interferometer as in claim 1, wherein the means for translating the Wollaston prism in a lateral direction comprises a piezoelectric transducer (PZT) operatively connected to the Wollaston prism, wherein said PZT includes an encoder.

7. A method for interferometrically testing a test optic, said method comprising the steps of:
   directing light from a light source along an optical path toward the test optic;
   directing the light through a Wollaston prism to shear the light into a reference beam and a signal beam;
   directing the reference beam through a pinhole of a diaphragm to produce a spherical reference wave;
   recombining the signal beam and the spherical reference wave to produce an interference fringe pattern on a detector; and
   measuring a phase value of the interference fringe pattern by translating the Wollaston prism in a lateral direction with respect to the optical path so as to phase-shift the signal beam and the spherical reference wave.

8. The method of claim 6, wherein the Wollaston prism is connected to a piezoelectric transducer (PZT) which includes an encoder, wherein said PZT translates the Wollaston prism in a lateral direction to phase step the light.

9. The method of claim 6, wherein the light from the light source is directed in series first through the test optic and then through the Wollaston prism positioned downstream from the test optic.

10. The method of claim 6, wherein the light from the light source is directed in series first through the Wollaston prism and then through the test optic positioned downstream from the Wollaston prism.

* * * * *